United States Patent
Satoh et al.

(10) Patent No.: US 7,800,590 B2
(45) Date of Patent: Sep. 21, 2010

(54) INPUT DEVICE, PORTABLE ELECTRONIC APPARATUS, REMOTE CONTROL DEVICE, AND PIEZOELECTRIC ACTUATOR DRIVING/CONTROLLING METHOD IN INPUT DEVICE

(75) Inventors: Kimiyasu Satoh, Kanagawa (JP); Hiroyuki Inokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1106 days.

(21) Appl. No.: 10/537,417

(22) PCT Filed: Oct. 8, 2003

(86) PCT No.: PCT/JP03/12886

§ 371 (c)(1),
(2), (4) Date: Jun. 2, 2005

(87) PCT Pub. No.: WO2004/053672

PCT Pub. Date: Jun. 24, 2004

(65) Prior Publication Data

US 2006/0050059 A1    Mar. 9, 2006

(30) Foreign Application Priority Data

Dec. 12, 2002 (JP) .............................. 2002-360608

(51) Int. Cl.
*G09G 5/00* (2006.01)
(52) U.S. Cl. ...................................... 345/173; 345/156
(58) Field of Classification Search .................. 345/173, 345/156
See application file for complete search history.

(56) References Cited

U.S. PATENT DOCUMENTS

| | | | | |
|---|---|---|---|---|
| 4,990,900 A | * | 2/1991 | Kikuchi | 345/174 |
| 5,982,304 A | | 11/1999 | Selker et al. | |
| 6,422,757 B1 | * | 7/2002 | Wu et al. | 384/517 |
| 6,776,546 B2 | * | 8/2004 | Kraus et al. | 400/472 |
| 2002/0033795 A1 | | 3/2002 | Shahoian et al. | |
| 2002/0149296 A1 | * | 10/2002 | Fujii et al. | 310/328 |
| 2003/0205450 A1 | * | 11/2003 | Divigalpitiya et al. | 200/512 |
| 2004/0125081 A1 | * | 7/2004 | Hayakawa | 345/156 |

FOREIGN PATENT DOCUMENTS

| | | | | |
|---|---|---|---|---|
| JP | 11212725 | * | 8/1999 | |
| JP | 2002259059 | * | 9/2002 | |

* cited by examiner

*Primary Examiner*—Bipin Shalwala
*Assistant Examiner*—Afroza Y Chowdhury
(74) *Attorney, Agent, or Firm*—Oblon, Spivak, McClelland, Maier & Neustadt, L.L.P.

(57) ABSTRACT

An input apparatus causes the user to feel a force sense as a feedback from an operation surface that he or she has pressed. When the input apparatus is in the standby state for the user to press the operation surface, a drive voltage is not supplied to a piezoelectric actuator. When the operation surface is pressed at timing T401, the drive voltage is gradually increased. At this point, as the piezoelectric actuator is curved, the operation surface is gradually raised. After predetermined period T1 has elapsed, at timing T402, the piezoelectric actuator is quickly curved in the reverse direction. At timing T403, the operation surface is deformed to the lowest position. This position of the operation surface is kept until the operation surface has been pressed at T404. When period T1 is sufficiently larger than period T2, immediately after the operation surface is pressed, it is deformed. Thereafter, since the operation surface is deformed in the reverse direction, the user can feel a strong force sense.

12 Claims, 9 Drawing Sheets

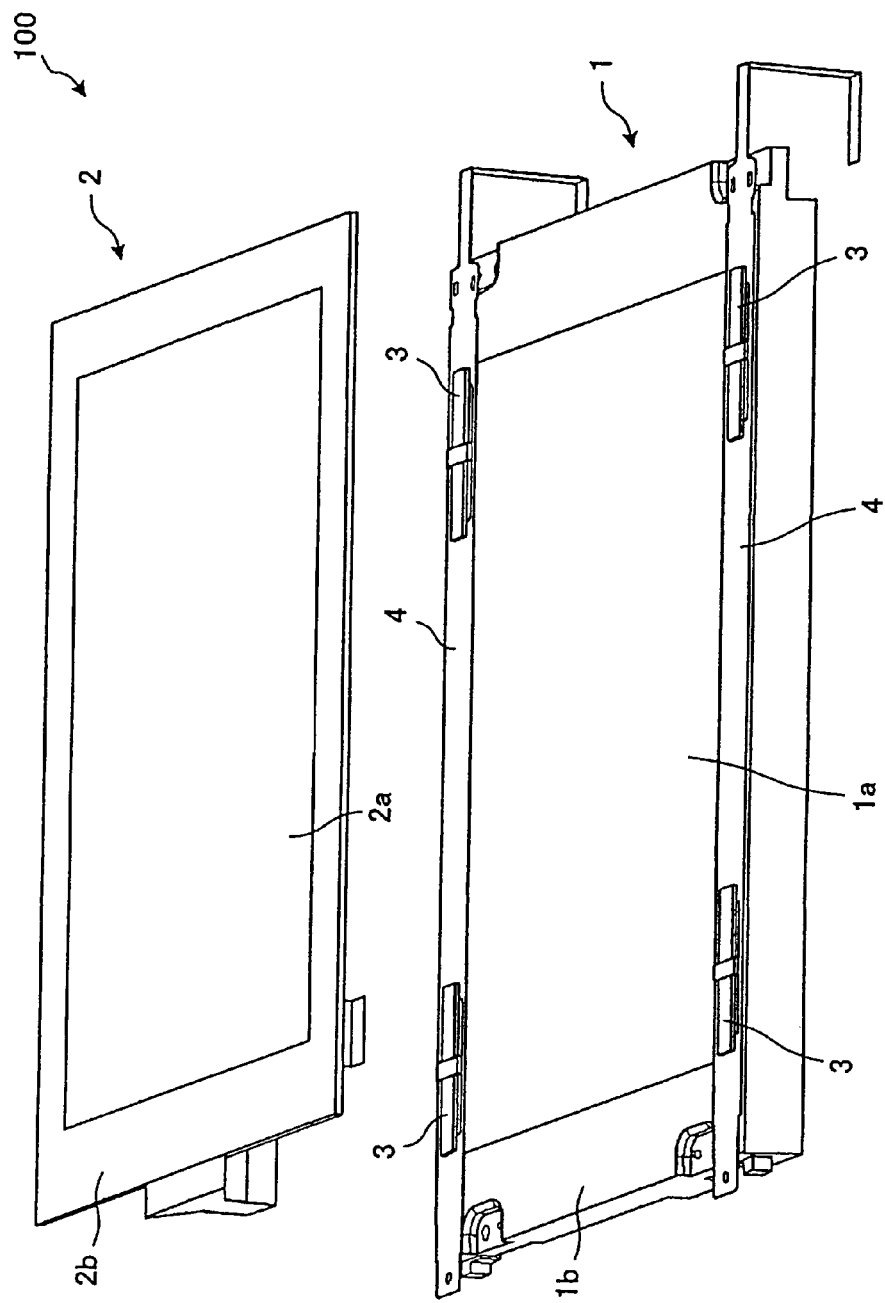

INPUT DEVICE, PORTABLE ELECTRONIC APPARATUS, REMOTE CONTROL DEVICE, AND PIEZOELECTRIC ACTUATOR DRIVING/CONTROLLING METHOD IN INPUT DEVICE

TECHNICAL FIELD

The present invention relates to an input apparatus, a portable electronic apparatus, a remote control apparatus, and a piezoelectric actuator drive control method for the input apparatus.

This application is based upon and claims the benefit of priority from the prior Japanese Patent Application No. 2002-360608, filed on Dec. 12, 2002, the entire contents of which are incorporated herein by reference.

BACKGROUND ART

In recent years, input apparatuses called touch panels have been widely used for automatic teller machines in financial institutions, ticketing machines in railroad stations, information processing apparatuses such as PDAs (Personal Digital Assistants), and so forth. The touch panel type input apparatus correlates icons and so forth displayed on a display such as an LCD (Liquid Crystal Display) with the coordinate system on the display panel and displays the position that the user has touched with his or her finger or a pointing device such as a pen so as to accomplish a GUI (Graphical User Interface) function.

In the conventional touch panel type input apparatus, when the user operates it and inputs data thereto, for example an icon that he or she has pressed varies in its appearance or an operation sound occurs so as to inform him or her that the input operation has been accepted. In contrast, in a recent touch panel, when the user presses an icon or the like, the height of the panel varies, causing a force sense to be fed back to his or her finger or a pointing device. As a result, since the user can feel as if he or she touched (clicked) a switch button, his or her operational feeling will improve.

For example, Japanese Patent Application Laid-Open Publication No. 2002-259059 (laid open on Sep. 13, 2002) discloses a resistor film type touch panel having a structure of which a plurality of electrode sheets on which transparent electrodes are formed are layered in such a manner that they are spaced apart by a predetermined length and their electrodes are oppositely aligned. In particular, the specification and FIG. 6 of this related art describe a touch panel having a multilayer structure, three or more electrode sheets, and actuators such as bobbin coils disposed between a casing that fixes the touch panel and a casing that fixes the display side so as to cause the user to feel a force sense as a feedback.

In addition, Japanese Patent Application Laid-Open Publication No. HEI 11-212725 (laid open on Aug. 6, 1999) discloses an information display apparatus that uses a piezoelectric device to cause the user to feel a force sense as a feedback and detect an operation input position. In particular, the specification and FIG. 3 of this related art describe an operation panel that is disposed on a liquid crystal display panel and that is supported by a piezoelectric device. The operation force and operation position are detected corresponding to a voltage that is generated in the piezoelectric device when the operation surface of the operation panel is pressed. When operation force larger than a predetermined threshold value is detected, a radio frequency wave is applied to the piezoelectric device to vibrate the operation surface.

The easiest method that allows the user to maximally feel a click sense with the force sense feedback function is to maximize the deformation amount of the touch panel. When the touch panel is deformed with the piezoelectric actuator in such a manner that the piezoelectric actuator is maximally curved in one direction and then maximally curved in the reverse direction, the maximum deformation amount of the touch panel is obtained. However, when the piezoelectric actuator is used in this manner, it is always necessary to maximally curve the piezoelectric actuator in one of two directions in the standby state. Since the curvature amount of the piezoelectric actuator is proportional to the voltage applied thereto, the power consumption of the piezoelectric actuator becomes large. In addition, the life of the piezoelectric actuator becomes short.

DISCLOSURE OF THE INVENTION

An object of the present invention is to provide an input apparatus, a portable electronic apparatus, a remote control apparatus, and a piezoelectric actuator drive control method for the input apparatus that are novel and allow the problems of the foregoing related art to be solved.

Another object of the present invention is to provide an input apparatus, a portable electronic apparatus, a remote control apparatus, and a piezoelectric actuator drive control method for the input apparatus that allows the user to feel a more natural operational sense than the related art does while the input apparatus has low power consumption and long life.

An input apparatus of the present invention outputs coordinate values of an operation surface that the user has pressed as an input operation, deforms the operation surface, and causes the user to feel a force sense as a feedback with the deformed operation surface. The input apparatus has a deformation mechanism portion that uses a piezoelectric actuator composed of a piezoelectric bi-morph device and that deforms the operation surface and a press force detection portion that detects whether the operation surface has been pressed. In addition, the input apparatus has a control portion that controls the deformation mechanism portion to start driving the piezoelectric actuator to gradually deform the operation surface in one direction and then in the reverse direction so that the period for which the operation surface is deformed in one direction is sufficiently larger than the period for which the operation surface is deformed in the reverse direction when the press force detection portion detects that the operation surface has been pressed.

In addition, the present invention relates to a portable electronic apparatus and a remote control apparatus that has the input apparatus.

In the input apparatus, the portable electronic apparatus, and the remote control apparatus, when the touch panel portion is pressed, the operation surface is gradually deformed in one direction and then deformed in the reverse direction under the control of the control portion. At this point, since the deformation period of the operation surface in one direction is sufficiently larger than the deformation period of the operation surface in the reverse direction, immediately after the operation surface is pressed, it is deformed. Thus, when the operation surface is deformed in the reverse direction, the user can feel a strong force sense. In addition, since the operation surface is deformed in one direction and then deformed in the reverse direction, when the operation surface is pressed while no voltage is applied to the piezoelectric actuator, the deformation amount of the operation surface can be maximized. Thus, while the power consumption of the piezoelectric actuator in the standby state is decreased and the life of the piezoelectric actuator is increased, the user can feel a more natural and clearer click sense than he or she can do with the related art.

In addition, the piezoelectric actuator drive control method of the present invention is applied to an input apparatus that has an operation surface that is pressed as an input operation, outputs the position at which the operation surface is pressed, deforms the operation surface, and causes the user to feel a force sense as a feedback. In the drive control method, when it is detected that the operation surface has been pressed, a voltage is applied to the piezoelectric actuator. After the operation surface is gradually deformed in one direction, the operation surface is deformed in the reverse direction. In addition, the piezoelectric actuator is driven so that the period for which the operation surface is deformed in one direction is sufficiently larger than the period for which the operation surface is deformed in the reverse direction.

In the piezoelectric actuator drive control method for the input apparatus, when the operation surface is pressed, it is gradually deformed in one direction and then deformed in the reverse direction. At this point, since the period for which the operation surface is deformed in one direction is sufficiently larger than the period for which the operation surface is deformed in the reverse direction, immediately after the operation surface is pressed, the operation surface is deformed. Thus, when the operation surface is deformed in the reverse direction, the user can feel a strong force sense from the operation surface. In addition, since the operation surface is deformed in one direction and then deformed in the reverse direction, when the operation surface is pressed while no voltage is applied to the piezoelectric actuator, the operation surface can be maximally deformed. Thus, while the power consumption of the piezoelectric actuator in the standby state is decreased and the life of the piezoelectric actuator is increased, the user can feel a more natural and clearer click sense than he or she can do with the related art.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is an exploded perspective view showing principal portions of an input apparatus according to the present invention.

BEST MODES FOR CARRYING OUT THE INVENTION

Figure 2A:
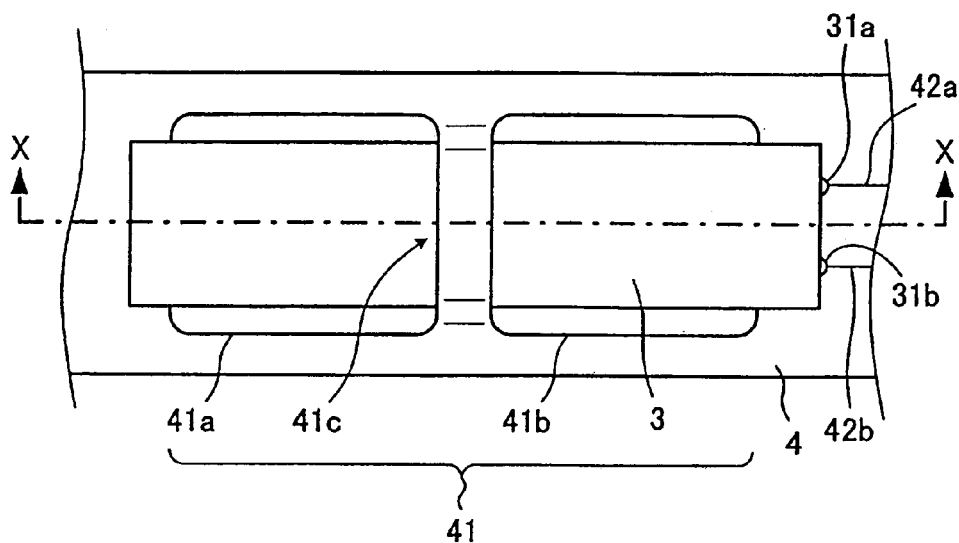
FIG. 2A and FIG. 2B are schematic diagrams showing a mounting state of a piezoelectric actuator on a flexible board.

Next, with reference to the accompanying drawings, preferred embodiments of the present invention will be described. The preferred embodiments that follow have technically preferable limitations. However, it should be noted that the scope of the present invention is not limited to these embodiments unless they describe limitations of the present invention.

FIG. 1 is an exploded perspective view showing the principal portions of an input apparatus according to an embodiment of the present invention. In the following, an input apparatus 100 that is used as a control panel that controls a broadcasting device such as a switcher device that switches one picture to another picture. The input apparatus 100 shown in FIG. 1 has a liquid crystal display portion 1 and a touch panel portion 2. Fixed on the display side of the liquid crystal display portion 1 is a flexible board 4 on which a piezoelectric actuator 3 is mounted.

The liquid crystal display portion 1 has a display panel 1a and a frame 1b. The display panel 1a displays a picture. The frame 1b holds the display panel 1a. Disposed in the display panel 1a are a liquid crystal substrate, a backlight, and so forth (not shown). The frame 1b is made from for example a metal. The frame 1b is disposed on the display surface of the display panel 1a so that the frame 1b does not obstruct the display area of the picture.

The touch panel portion 2 has a press portion 2a and a frame 2b. The press portion 2a is pressed by the user. The frame 2b holds the press portion 2a. The press portion 2a is made of a transparent resin sheet or the like. The press portion 2a transmits a picture that the display panel 1a of the liquid crystal display portion 1 displays. The frame 2b is made from for example a metal. The frame 2b is disposed so that it does not obstruct the display area of the display panel 1a.

The touch panel portion 2 is for example a so-called resistance film type touch panel. The touch panel portion 2 has a structure of which a plurality of electrode sheets on which a transparent electrode is formed are layered so that they are equally spaced and the electrode surfaces are oppositely aligned. When the press portion 2a is pressed by a user's finger or a pointing device such as a pen, the electrode sheets contact each other. By detecting resistance changes of the electrode sheets, the pointed position can be identified as coordinate values.

The piezoelectric actuator 3 is composed of a piezoelectric bi-morph device. The piezoelectric actuator 3 curves and deforms corresponding to a drive voltage supplied through the electrodes formed on the flexible board 4. The flexible board 4 is a flexible wiring board on which electrodes are formed with conductive metal foil such as copper foil on a resin film for example polyimide. The flexible board 4 has electrodes from which a drive voltage is applied to the piezoelectric actuator 3. A pair of through-holes (that will be described later) are formed in the flexible board 4. With the through-holes, the piezoelectric actuator 3 is held.

The touch panel portion 2 is disposed so that the flexible board 4 and the piezoelectric actuator 3 are sandwiched by the front surface of the liquid crystal display portion 1 and the touch panel portion 2. The press portion 2a of the touch panel portion 2 transmits a picture of operation function items such as icons displayed on the display panel 1a of the liquid crystal display portion 1. When the user touches a picture display position on the press portion 2a with his or her finger or a pointing device such as a pen, an input operation corresponding to the displayed picture is performed.

The liquid crystal display portion 1 and the touch panel portion 2 are disposed on an outer casing (not shown) of the input apparatus 100 so that the touch panel portion 2 can vertically move to and from the display surface of the liquid crystal display portion 1. Thus, as the piezoelectric actuator 3 curves and deforms, the distance between the liquid crystal display portion 1 and the touch panel portion 2 varies. Thus, at timing the user presses the press portion 2a of the touch panel portion 2, the piezoelectric actuator 3 curves and deforms. As a result, a force sense is fed back to the user. The user can feel as if he or she pressed (clicked) a switch button. A circuit that detects that the touch panel has been pressed and that drives and controls the piezoelectric actuator 3 depending on whether the touch panel has been pressed is encased in for example the outer casing.

Figure 2B:
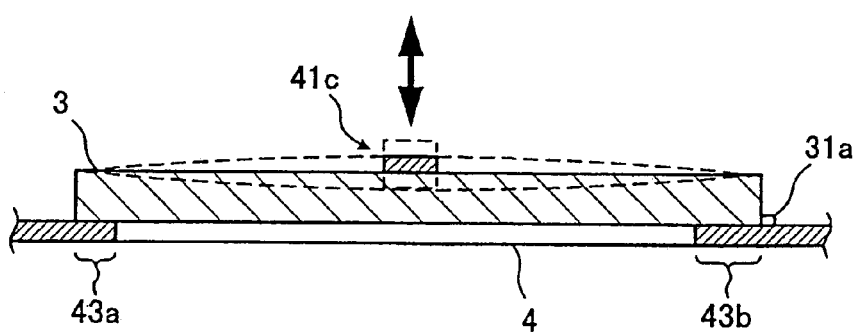

FIG. 2A and FIG. 2B show a mounting state of the piezoelectric actuator 3 on the flexible board 4. FIG. 2A is a plan view showing a part of the flexible board 4. FIG. 2B is a sectional view taken along line X-X of FIG. 2A.

As shown in FIG. 2A and FIG. 2B, formed on the flexible board 4 are a mounting portion 41 and wiring patterns 42a and 42b. The mounting portion 41 is composed of a pair of through-holes 41a and 41b. The wiring patterns 42a and 42b supply a drive voltage to the piezoelectric actuator 3.

Formed and aligned in the mounting portion 41 are the through-holes 41a and 41b that have the same shape. A center spacer portion 41c is formed between the through-holes 41a and 41b. The center spacer portion 41c is made of a resin film that is left in a bridge shape from the flexible board 4. According to this embodiment, the two mounting portions 41 are disposed on the flexible board 4.

The wiring patterns 42a and 42b are formed so that they are connected to two respective lines formed on one end of the mounting portion 41. On the other hand, wiring terminals 31a and 31b are disposed on one end of the piezoelectric actuator 3. When the wiring terminals 31a and 31b are contacted with the wiring patterns 42a and 42b respectively on the flexible board 4, a drive voltage is supplied from a driver (not shown) to the piezoelectric actuator 3.

The piezoelectric actuator 3 is inserted into the through-hole 41a from the front of the mounting portion 41. Then, the piezoelectric actuator 3 is inserted into the through-hole 41b from the rear of the mounting portion 41 through the center spacer portion 41c. As a result, the piezoelectric actuator 3 is mounted on the flexible board 4 so that both end portions in the longitudinal direction of the piezoelectric actuator 3 contact the front surface of the flexible board 4. The piezoelectric actuator 3 is relatively highly rigid and the flexible board 4 easily deforms. Thus, as shown in FIG. 2B, the piezoelectric actuator 3 is held by the mounting portion 41 in the state that only the center spacer portion 41c deforms upward. At this point, the wiring terminals 31a and 31b disposed on one end of the piezoelectric actuator 3 are contacted with the wiring patterns 42a and 42b, respectively, on the flexible board 4 and they are electrically connected. In reality, after they are connected, they are connected by solder or the like. Thus, the piezoelectric actuator 3 is fixed on the flexible board 4.

After the piezoelectric actuator 3 has been mounted on the flexible board 4 in the foregoing manner, the flexible board 4 is disposed between the frame 1b of the liquid crystal display portion 1 and the frame 2b of the touch panel portion 2. At this point, for example the upper surface of the center spacer portion 41c shown in the drawing contacts the frame 2b of the touch panel portion 2. Regions 43a and 43b that the lower surface of the flexible board 4 shown in the drawing contacts the piezoelectric actuator 3 contact the frame 1b of the liquid crystal display portion 1. This mounting structure causes the center spacer portion 41c of the flexible board 4 to function as a spacer disposed between the frame 2b of the touch panel portion 2 and the piezoelectric actuator 3. On the other hand, the regions 43a and 43b of the flexible board 4 function as a spacer between the frame 1b of the liquid crystal display portion 1 and the piezoelectric actuator 3.

When a drive voltage is supplied to the piezoelectric actuator 3 in this state, the piezoelectric actuator 3 curves and deforms. At this point, as the center portion of the piezoelectric actuator 3 deforms, the center spacer portion 41c vertically moves toward the liquid crystal display portion 1. Thus, as the center spacer portion 41c deforms, the touch panel portion 2 moves. As a result, the force feedback function for the user is accomplished.

A reinforcement plate made of a high rigidity material such as celluloid may be adhered on the front surface of the center spacer portion 41c or the rear surface of the flexible substrate 4 both the end portions of the piezoelectric actuator 3 contact.

This mounting manner of the piezoelectric actuator 3 is just an example. Thus, the piezoelectric actuator 3 may be mounted in another manner as long as one spacer is disposed in the vicinity of the center portion on one surface of the piezoelectric actuator 3 and two spacers are disposed at both end portions in the longitudinal direction on the other surface of the piezoelectric actuator 3.

The curvature amount of the piezoelectric actuator 3 is proportional to the drive voltage applied thereto. As described above, the piezoelectric actuator 3 has two wiring terminals 31a and 31b. When the potential between these terminals is increased, the curvature amount of the piezoelectric actuator 3 is increased. When the polarity of the drive voltage is reversed, the direction of the curvature of the piezoelectric actuator 3 can be reversed.

Figure 3:
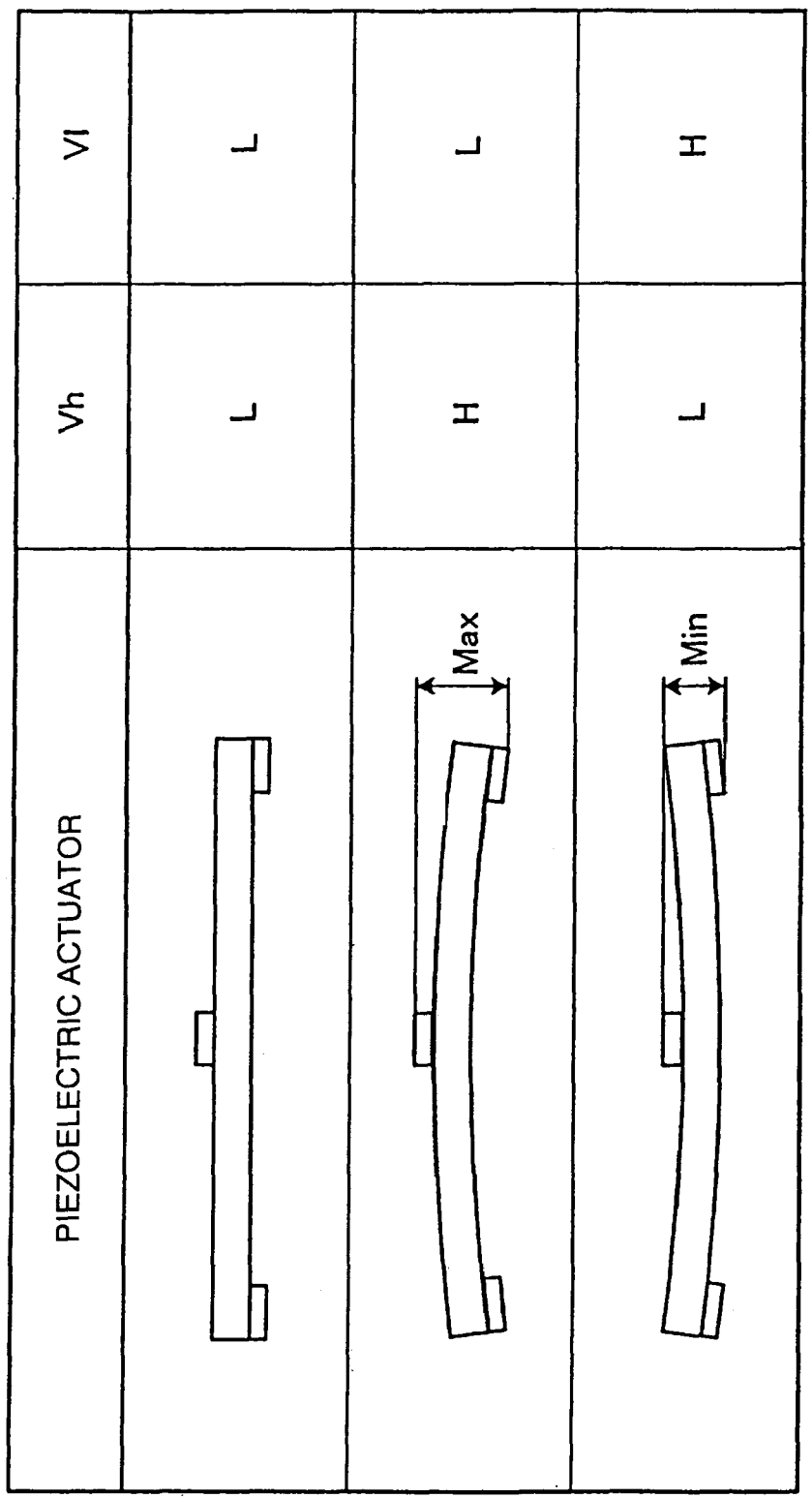
FIG. 3 is a schematic diagram showing the relationship of curvatures of the piezoelectric actuator and drive voltages thereof.

FIG. 3 is a schematic diagram showing the relationship of the curvatures of the piezoelectric actuator 3 and the drive voltages applied thereto.

In FIG. 3, the drive voltages applied to the wiring terminals 31a and 31b are denoted by Vh and Vl, respectively. In addition, FIG. 3 shows curved sections of the piezoelectric actuator 3 along with regions of the flexible board 4 that function as spacers among the piezoelectric actuator 3, the touch panel portion 2, and the liquid crystal display portion 1.

As shown in FIG. 3, when the levels of both the drive voltages Vh and Vl are L (for example, ground level), the piezoelectric actuator 3 does not curve. When the levels of the drive voltages Vh and Vl are H and L, respectively, the piezoelectric actuator 3 curves for example upward. When the levels of the drive voltages Vh and Vl are L and H, respectively, the piezoelectric actuator 3 curves downward. When the piezoelectric actuator 3 curves upward, the touch panel portion 2 maximally deforms upward. When the piezoelectric actuator 3 curves downward, the touch panel portion 2 minimally deforms.

When the touch panel portion 2 causes the user to feel a force sense as a feedback, the click sense that the user clearly feels is proportional to the amount of instantaneous deformation of the touch panel portion 2. Thus, it is preferred that the piezoelectric actuator 3 be maximally curved in one direction and then maximally curved in the reverse direction. This means that before and after a click sense is fed back, the drive voltage applied to the piezoelectric actuator 3 needs to be maximized. In this operation, the standby power of the piezoelectric actuator 3 becomes large before the touch panel portion 2 is operated. In addition, when the piezoelectric actuator 3 is in the standby state, it is always energized. Thus, the life of the piezoelectric actuator 3 is decreased.

Figure 4:
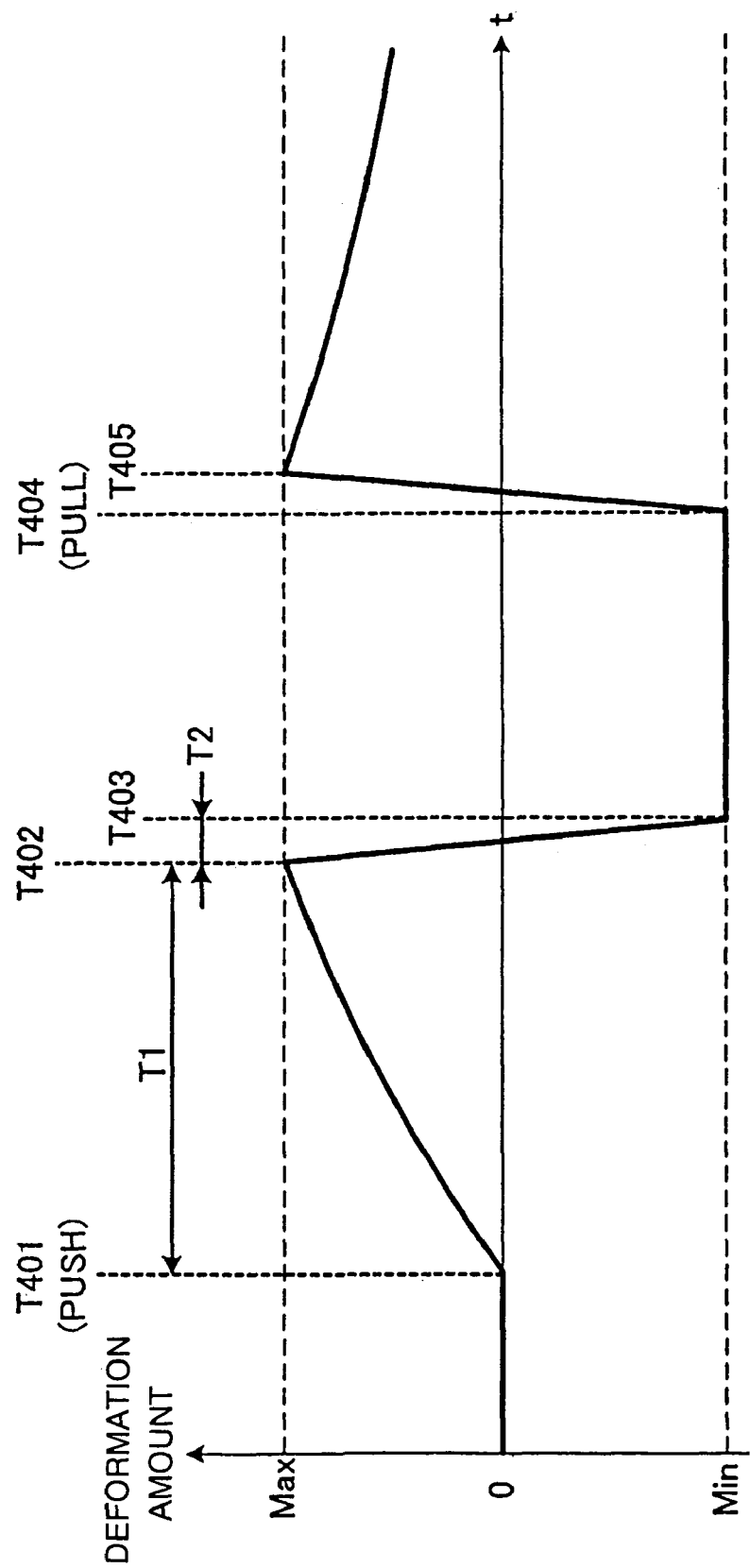
FIG. 4 is a graph showing the amounts of deformation of a touch panel portion corresponding to an operation of the piezoelectric actuator.

Thus, according to the present invention, when the piezoelectric actuator 3 is in the standby state, the drive voltage is not applied to the piezoelectric actuator 3 as shown in FIG. 4. When the touch panel portion 2 is operated, the piezoelectric actuator 3 is gradually curved so that the user does not feel a force sense as much as possible. Thereafter, the piezoelectric actuator 3 is quickly curved in the reverse direction so that the user feels a strong force sense. As a result, a force sense feedback function that allows the user to feel an excellent operational sense can be accomplished with the piezoelectric actuator 3 while its power consumption is decreased and its life is increased.

FIG. 4 shows variation of the amounts of deformation of the touch panel portion 2 corresponding to the operation of the piezoelectric actuator 3. FIG. 4 shows the relationship of the amounts of deformation of the touch panel portion 2 that is pressed and elapsed times. It is assumed that the touch panel portion 2 is pressed downward, that the position of the touch panel portion 2 to which the drive voltage is not applied is referred to as deformation amount "0", and that the maximum and minimum positions of the touch panel portion 2 when the curvature amount of the piezoelectric actuator 3 is the maximum are referred to as the deformation amounts "Max" and "Min," respectively.

Before the user has pressed the touch panel portion 2 at timing T401, the piezoelectric actuator 3 does not curve. When the user presses the touch panel portion 2 at timing T401, the piezoelectric actuator 3 is driven to cause the touch panel portion 2 to gradually deform upward. After a predetermined time period has elapsed, at timing T402, the touch panel portion 2 maximally rises. Thereafter, the piezoelectric actuator 3 causes the touch panel portion 2 to deform in the reverse direction. At timing T403, the touch panel portion 2 maximally lowers. Until the panel surface has been pressed, the touch panel portion 2 is kept at the lowest position.

After the user has pressed the touch panel portion 2, when he or she releases his or her finger or a pointing device from the panel surface at timing T404, the piezoelectric actuator 3 causes the touch panel portion 2 to deform in the reverse direction (upward). At timing T405, the piezoelectric actuator 3 maximally raises the touch panel portion 2 and then gradually causes the touch panel portion 2 to deform to the position of the deformation amount "0."

In the transition of the positions of the touch panel portion 2, in period T1 from timings T401 to T402, the panel surface of the touch panel portion 2 is relatively gradually deformed upward. On the other hand, in period T2 from timings T402 to T403, the panel surface of the touch panel portion 2 is quickly lowered. When period T1 is much longer than period T2, in period T1, the user does not almost feel a force sense due to the deformation of the touch panel portion 2. In period T2, the user can feel a clear click sense with a much larger force sense than that in period T1.

In period T2, the deformation amount of the touch panel portion 2 is varied from the maximum to the minimum. In other words, when the deformation amount of the touch panel portion 2 is maximized in the performance of the piezoelectric actuator 3, the click sense that the user can feel can be maximized. Thus, when the drive voltage is not applied to the piezoelectric actuator 3 that is in the standby state, the piezoelectric actuator 3 can cause the user to feel a clearer click sense and a more natural operational sense than the related art can do.

It is preferred that period T2 from timings T402 to T403 be as short as possible. However, when the touch panel portion 2 largely deforms in a short period, the piezoelectric actuator 3 and the frames 1b and 2b that contact through a resin member of the flexible board 4 generate noise.

When a drive voltage of around 20 V is applied to the piezoelectric actuator 3 that is around 30 mm long, the deformation amount at the center portion in each of the upper and lower directions is a maximum of around 200 μm. In this case, when the period of deformation for which the piezoelectric actuator 3 is maximally deformed from one direction to the reverse direction is in the range from 2 msec to 3 msec, the noise level can be decreased without a sacrifice of the user's operational sense. At this point, it is preferred that period T1 be around 33 times or more as large as period T2 to cause the user to feel a natural operational sense.

On the other hand, period T1 from timings T401 to T402 in which the panel surface is pressed is a delay period after the user presses the panel surface until he or she feels a click sense. To prevent this delay from deteriorating the user's operational sense, it is preferred that period T1 be 200 msec or less.

Figure 5:
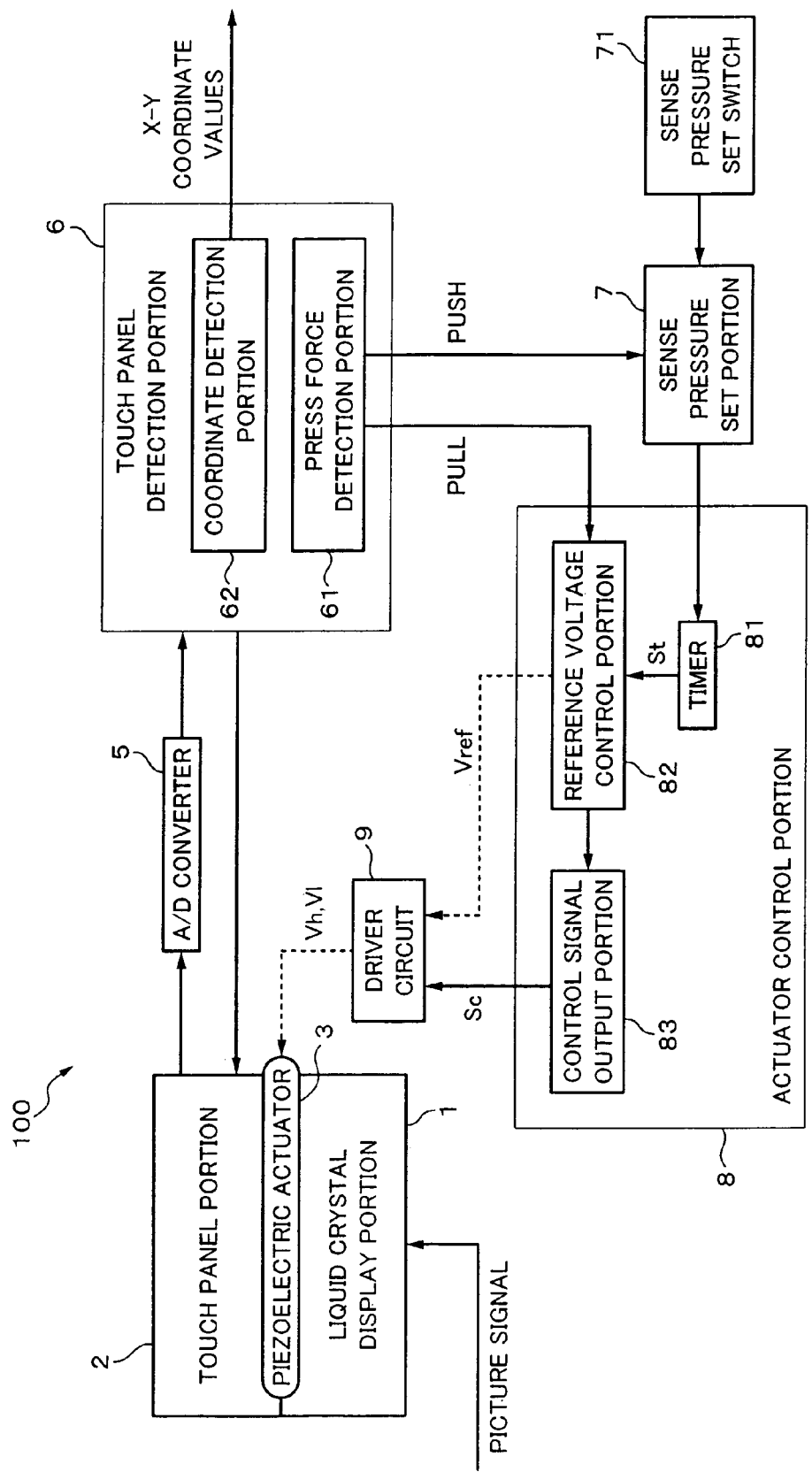
FIG. 5 is a block diagram showing functions of an input apparatus according to a first embodiment of the present invention.

Next, an example of a structure that accomplishes the operation of the piezoelectric actuator 3 will be described. FIG. 5 is a block diagram showing functions of an input apparatus 100.

The input apparatus 100 has an A/D converter 5, a touch panel detection portion 6, a sense pressure set portion 7, a sense pressure set switch (SW) 71, an actuator control portion 8, and a driver circuit 9. The A/D converter 5 converts a signal detected in the touch panel portion 2 into a digital signal. The touch panel detection portion 6 detects coordinate values and the state whether the panel surface has been pressed corresponding to the converted digital signal. The sense pressure set portion 7 and the sense pressure set switch (SW) 71 set the deformation amount of the touch panel portion 2 for a force sense to be fed back to the user. The actuator control portion 8 controls the operation of the piezoelectric actuator 3. The driver circuit 9 drives the piezoelectric actuator 3.

The A/D converter 5 converts the signal detected from the touch panel portion 2 into a digital signal and supplies the digital signal to the touch panel detection portion 6.

The touch panel detection portion 6 outputs a control signal to the touch panel portion 2 to scan X-Y coordinates on the panel. The touch panel detection portion 6 has a press force detection portion 61 and a coordinate detection portion 62. The digital signal of the A/D converter 5 is input to the press force detection portion 61 and the coordinate detection portion 62.

The press force detection portion 61 detects a timing at which the user presses the touch panel portion 2 with his or her finger, a pointing device, or the like in accordance with the signal that is output from the A/D converter 5 (this timing is referred to as "PUSH timing") and a timing at which the user releases his or her finger, the pointing device, or the like from the touch panel portion 2 (this timing is referred to as "PULL timing"). The press force detection portion 61 supplies the PUSH timing to the sense pressure set portion 7 and the PULL timing to a reference voltage control portion 82 of the actuator control portion 8. The coordinate detection portion 62 outputs as X-Y coordinate values the position that the user has pressed on the touch panel portion 2 corresponding to the signal of the A/D converter 5 to the outside of the input apparatus 100.

The sense pressure set switch 71 is connected to the sense pressure set portion 7. The sense pressure set switch 71 can set a plurality of levels of sensitivity of a force sense that the user can feel with the force sense feedback function of the touch panel portion 2. The sense pressure set switch 71 can set for example three sense levels "Hard (highest sensitivity)," "Mid" and "Soft (lowest sensitivity)." The sense pressure set portion 7 supplies a timer set value to a timer 81 of the actuator control portion 8 corresponding to the setting of the sense pressure set switch 71. In addition, the sense pressure set portion 7 supplies an operation start signal to the timer 81 at the PUSH timing supplied from the press force detection portion 61. When the timer set value of the timer 81 is changed, as will be described later, the deformation amount of the touch panel portion 2 is varied. As a result, the sensitivity of the force sense that the user feels is varied.

The actuator control portion 8 has the timer 81, a reference voltage control portion 82, and a control signal output portion 83. The timer 81 supplies to the reference voltage control portion 82 a signal that represents an output voltage increase timing corresponding to the timer set value that is set by the sense pressure set portion 7. In reality, when the actuator control portion 8 receives the operation start signal from the sense pressure set portion 7, the timer 81 starts counting. Until the timer 81 has counted the timer set value, the timer 81 outputs a timing signal St.

The reference voltage control portion 82 supplies a reference voltage Vref to the driver circuit 9 corresponding to the timing signal St received from the timer 81 and the PULL timing received from the press force detection portion 61. The reference voltage control portion 82 has a filter. When the reference voltage Vref is applied, the voltage is gradually increased at a constant rate until the voltage becomes the predetermined maximum value. After the reference voltage Vref has been applied, the voltage is gradually decreased at a constant rate. The reference voltage control portion 82 supplies both the count end timing for the timer 81 and the PULL timing to the control signal output portion 83.

The control signal output portion 83 outputs a control signal that causes the polarity of the output signal of the driver circuit 9 to be changed in accordance with the timing signals of the reference voltage control portion 82. In reality, after the timer 81 has counted the predetermined count value until the control signal output portion 83 receives the PULL timing, the control signal output portion 83 outputs the control signal that causes the polarity of the output voltage of the driver circuit 9 to be changed.

The driver circuit 9 applies the drive voltages Vh and Vl to the piezoelectric actuator 3 corresponding to the signals supplied from the reference voltage control portion 82 and the control signal output portion 83. In reality, the driver circuit 9 is connected to two wiring terminals 31a and 31b of the piezoelectric actuator 3. The driver circuit 9 varies the drive voltages Vh and Vl that are output to the wiring terminals 31a and 31b corresponding to the reference voltage supplied from the reference voltage control portion 82. At this point, when the driver circuit 9 receives the control signal from the control signal output portion 83, the driver circuit 9 outputs the drive voltage Vl. When the driver circuit 9 does not receive the control signal, the driver circuit 9 outputs the drive voltage Vh. As a result, the driver circuit 9 changes the polarity of the voltage applied to the piezoelectric actuator 3.

An information processing apparatus (not shown) is connected to the input apparatus 100. The information processing apparatus outputs a picture signal to the liquid crystal display portion 1, receives X-Y coordinate values corresponding to a user's input operation on the touch panel portion 2 from the coordinate detection portion 62, and performs a predetermined process. The information processing apparatus displays pictures of operation function items such as icons on the liquid crystal display portion 1. The information processing apparatus receives the position at which the touch panel portion 2 is pressed as X-Y coordinate values, recognizes an operation function item corresponding to the X-Y coordinate values, and performs a process corresponding to the recognized operation function item.

Figure 6:
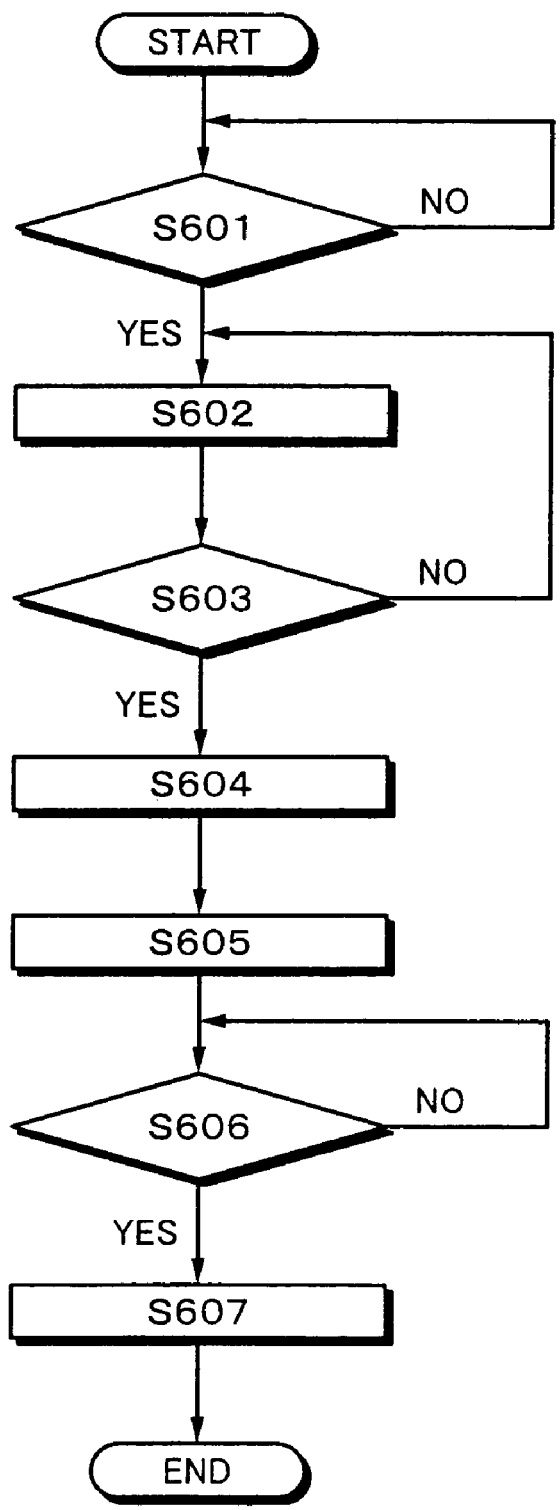
FIG. 6 is a flow chart showing a process of a reference voltage control portion.

FIG. 6 is a flow chart showing a process of the reference voltage control portion 82. Before the process shown in the flow chart is stared, the output voltage value of the reference voltage Vref supplied to the driver circuit 9 is "0." The level of the timing signal supplied to the control signal output portion 83 is L.

At step S601, the reference voltage control portion 82 monitors the timing signal St received from the timer 81. When the level of the timing signal St becomes H, the reference voltage control portion 82 determines that the timer 81 has started the count operation. Thereafter, the flow advances to step S602. At step S602, the reference voltage control portion 82 gradually increases the output voltage value of the reference voltage Vref corresponding to a predetermined waveform.

At step S603, the reference voltage control portion 82 monitors the timing signal St received from the timer 81 and continuously increases the output voltage value of the reference voltage Vref until the level of the timing signal St becomes L. When the level of the timing signal St becomes L, the reference voltage control portion 82 determines that the reference voltage control portion 82 has completed the count operation. Thereafter, the flow advances to step S604.

At step S604, in the state that the level of the timing signal St is L, the reference voltage control portion 82 holds the output voltage value of the reference voltage Vref. At step S605, the reference voltage control portion 82 changes the level of the timing signal that is output to the control signal output portion 83 to H.

At step S606, the reference voltage control portion 82 monitors the timing signal received from the press force detection portion 61 and continuously outputs the reference voltage Vref until the reference voltage control portion 82 receives the PULL timing. When the reference voltage control portion 82 receives the PULL timing, the flow advances to step S607. At step S607, the reference voltage control portion 82 changes the level of the timing signal that is supplied to the control signal output portion 83 to L.

Figure 7:
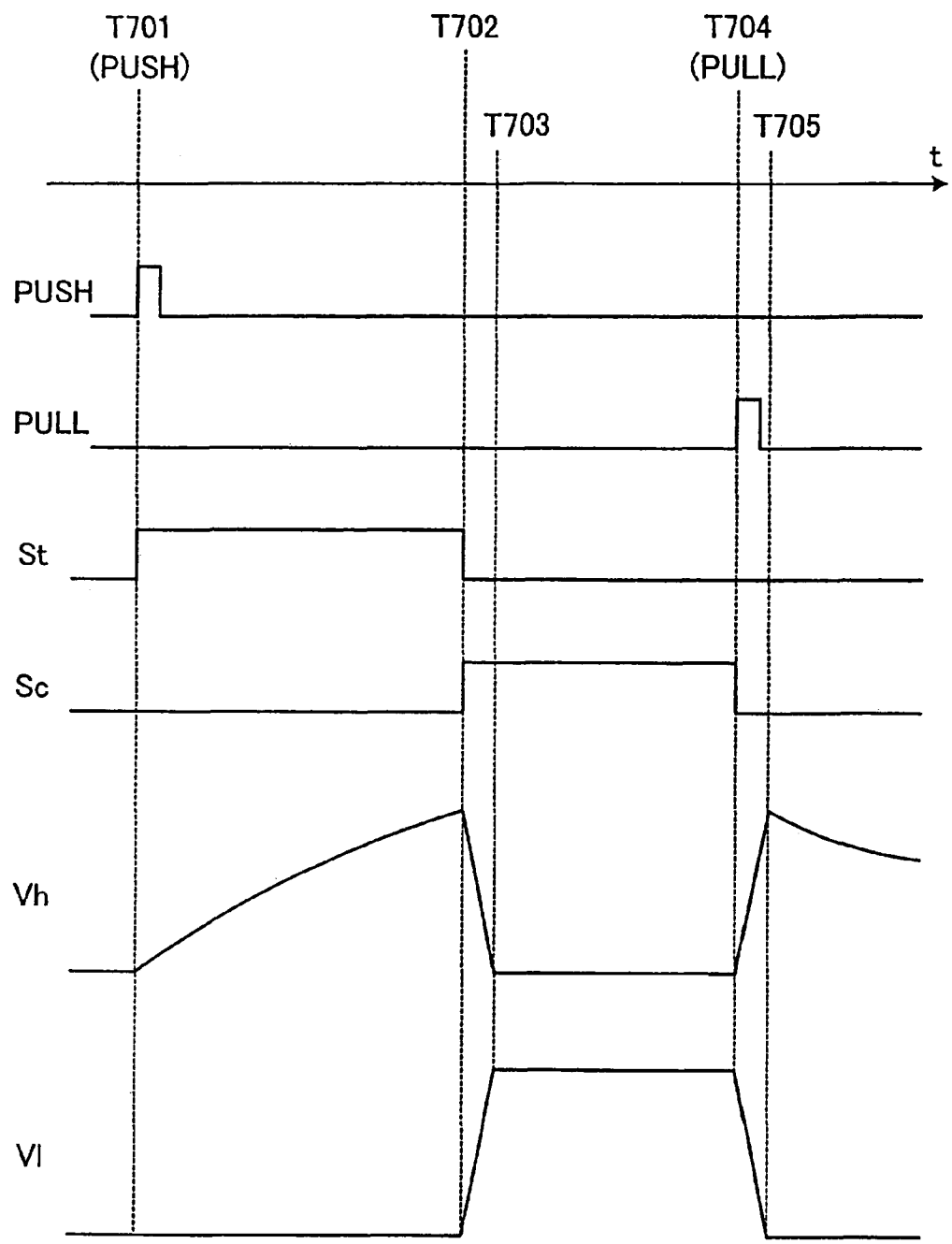
FIG. 7 is a timing chart showing waveforms of output signals of the input apparatus and output voltages of a driver circuit.

FIG. 7 is a timing chart showing waveforms of output signals of the input apparatus 100 and output voltages of the driver circuit 9. In FIG. 7, timings T701 to T705 correspond to timings T401 to T405 shown in FIG. 4, respectively. When the user presses the touch panel portion 2 at timing T701 shown in FIG. 7, the press force detection portion 61 detects a timing at which the user presses the touch panel portion 2 (this timing is referred to as PUSH timing). The press force detection portion 61 informs the timer 81 of this timing through the sense pressure set portion 7 to cause the timer 81 to start the count operation. As a result, the level of the timing signal St becomes H. The reference voltage control portion 82 gradually increases the output voltage value of the reference voltage Vref that is supplied to the driver circuit 9 corresponding to the timing signal St.

The driver circuit 9 decides the drive voltage Vh or Vl that is output corresponding to the value of the reference voltage Vref that is input. At this point, since the level of the control signal Sc supplied from the control signal output portion 83 to the driver circuit 9 is L, as shown in FIG. 7, the driver circuit 9 gradually increases the drive voltage Vh that is output to the wiring terminal 31a of the piezoelectric actuator 3.

Next, at timing T702, when the timer 81 has counted the timer set value that is set by the sense pressure set portion 7, the level of the timing signal St supplied from the timer 81 becomes L. When the reference voltage control portion 82 detects that the level has changed, the reference voltage control portion 82 holds the output voltage value of the reference voltage Vref and supplies the detection timing of the level change of the timing signal St to the control signal output portion 83. The control signal output portion 83 changes the level of the control signal Sc supplied to the driver circuit 9 to H corresponding to the timing signal received from the reference voltage control portion 82.

When the level of the control signal 83 changes, the driver circuit 9 stops outputting the drive voltage Vh and starts outputting the drive voltage Vl. At this point, the driver circuit 9 holds the output voltage value corresponding to the reference voltage Vref in the state at timing T702. At timing T703, the driver circuit 9 applies a constant drive voltage Vl to the wiring terminal 31*b* of the piezoelectric actuator 3.

Next, at timing T704, when user releases his or her finger or a pointing device from the touch panel portion 2, the press force detection portion 61 detects the PULL timing. The reference voltage control portion 82 receives the PULL timing and gradually decreases the output voltage value of the reference voltage Vref that is supplied to the driver circuit 9. The ratio of which the voltage decreases may be smaller than the ratio of which the voltage increases at timings T701 to T702. The PULL timing is supplied to the control signal output portion 83 through the reference voltage control portion 82. The control signal output portion 83 changes the level of the control signal Sc that is supplied to the driver circuit 9 to L.

The driver circuit 9 stops outputting the drive voltage V and starts outputting the drive voltage Vh corresponding to the level change of the control signal Sc. The driver circuit 9 gradually decreases the output voltage corresponding to the reference voltage Vref. At timing T705, the drive voltage Vh is applied to the wiring terminal 31*a* of the piezoelectric actuator 3. The voltage value gradually decreases.

Thus, the touch panel portion 2 is deformed as shown in FIG. 4. In other words, when the touch panel portion 2 is pressed, it is deformed in the reverse direction of which it is pressed. Thereafter, the touch panel portion 2 is largely deformed in the direction of which it is pressed. Immediately after the touch panel portion 2 is pressed, since it is gradually deformed, the user does not almost feel the deformation. Thereafter, when the touch panel portion 2 is quickly deformed in the direction of which it is pressed, the user feels a clear click sense. As a result, since the user can feel a more natural and clearer click sense than he or she can do with the related art, the user's operational sense is improved. In addition, the noise level that takes place due to the deformation of the touch panel portion 2 decreases.

When the piezoelectric actuator 3 is in the standby state before the touch panel portion 2 is pressed, the drive voltages Vh and Vl supplied to the piezoelectric actuator 3 are 0 V. Thus, the piezoelectric actuator 3 does not consume power. In addition, only when the touch panel portion 2 is pressed, since the piezoelectric actuator 3 curves, the life of the piezoelectric actuator 3 increases.

The input apparatus 100 can set a plurality of levels of sensitivity of a click sense that the user feels with the deformation of the touch panel portion 2. The deformation amount of the touch panel portion 2 can be varied from timings T402 to T403 shown in FIG. 4 corresponding to user's preference. The sense pressure can be set by the sense pressure set portion 7. In this case, the sense pressure set portion 7 varies the timer set value of the timer 81. The user can freely vary the timer set value of the sense pressure set portion 7 with the sense pressure set switch 71.

Figure 8:
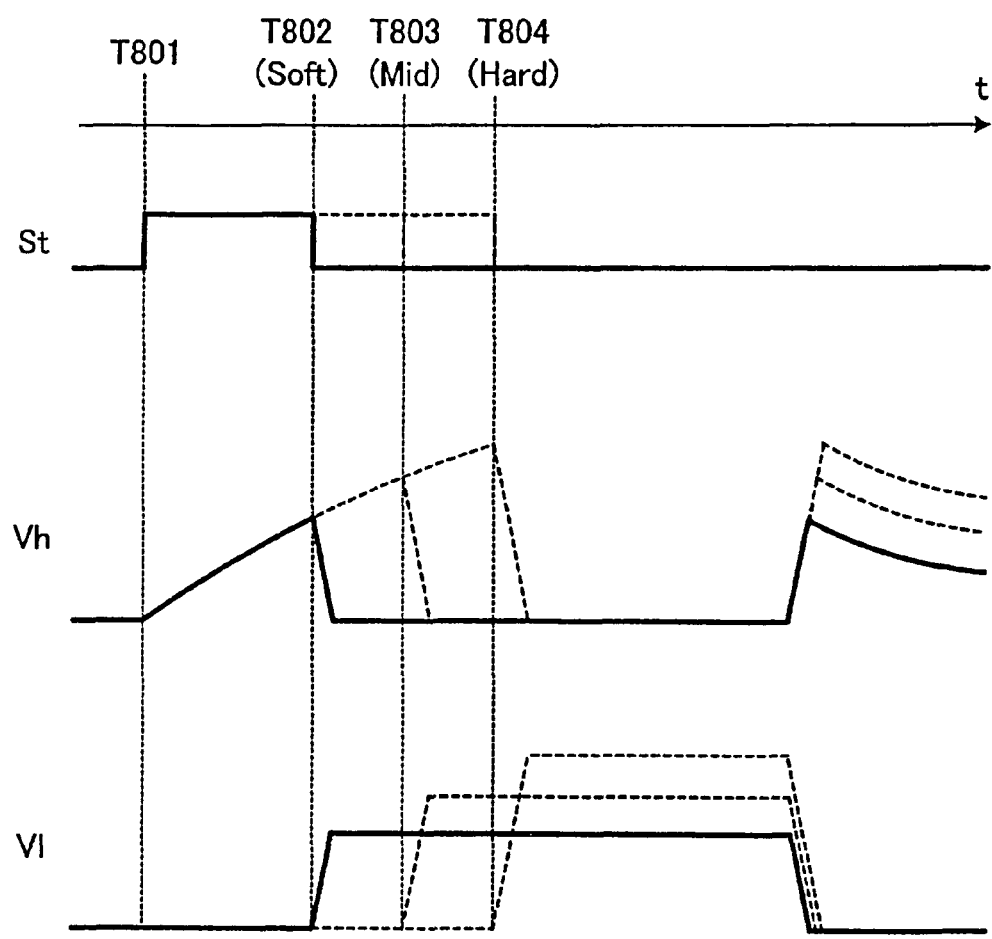
FIG. 8 is a timing chart showing the relationship of drive voltages of the piezoelectric actuator and set values of a timer.

FIG. 8 is a timing chart showing the relation ship of the drive voltages of the piezoelectric actuator 3 and corresponding to variation of the timer set values of the timer 81.

It is assumed that three sense levels "Hard (highest sensitivity)," "Mid," and "Soft (lowest sensitivity)" can be set. In reality, the timer 81 is set to 80 msec for "Hard," 40 msec for "Soft", and 60 msec for "Mid." Thus, as shown in FIG. 8, when the PUSH timing is detected at timing T801, the timer 81 outputs the timing signal St to the reference voltage control portion 82. The timing signal St is held in H level for a period corresponding to the timer set value. Timings T802, T803, and T804 at which the level of the timing signal St is changed to L correspond to the sense settings "Soft," "Mid," and "Hard," respectively.

When the level of the timing signal St of the timer 81 is changed to H, the reference voltage control portion 82 outputs the reference voltage Vref always corresponding to the same waveform regardless of the sense setting. Thus, when the count period of the timer 81, namely the period for which the timing signal St is output, is decreased, the final output voltage value of the reference voltage Vref decreases. As a result, the deformation amount of the touch panel portion 2 decreases.

In the foregoing structure, as the deformation amount of the touch panel portion 2 decreases, the delay period after the user presses the touch panel portion 2 until he or she feels a click sense decreases. Thus, the user who wants a strong click sense may set the pressure sense "Hard." The user who prefers a quick response to a strong click sense may set the sense pressure "Soft." When the user prefers a quick response of a force sense feedback, he or she tends to continuously and quickly perform button operations. In this case, when the deformation amount of the touch panel portion 2 is decreased, the load applied to the finger of the user who presses the touch panel portion 2 is lightened and the operational sense is improved.

Thus, the voltage value of the reference voltage Vref applied to the driver circuit 9 is controlled with the timer 81 so that the deformation amount and the response time of the touch panel portion 2 are varied. As a result, since multiple levels of sense pressures can be easily set, the user can feel a natural operational sense in multiple levels.

In the foregoing embodiment, when the touch panel portion 2 is pressed, it is quickly deformed in the direction of which it is pressed so that the user can feel a click sense. Alternatively, after the touch panel portion 2 is pressed, it may be deformed in the reverse direction. In this case, when the user feels a strong repelling force with his finger or pointing device, he or she can know that his input has been accepted.

The input apparatus can be suitably used for information processing apparatuses such as personal computers (PCs), cellular phones, portable information terminals such as PDAs, and electronic devices such as DSCs (digital still cameras) and DVCs (digital video camcorders). In addition, the input apparatus may be used for display input devices that control any devices such as cash dispensers (CDs) and automatic teller machines (ATMs) of financial institutions and game devices as well as broadcasting devices such as switcher devices. In addition, the input apparatus can be used as display input devices for remote control apparatuses that remotely control those devices.

Figure 9:
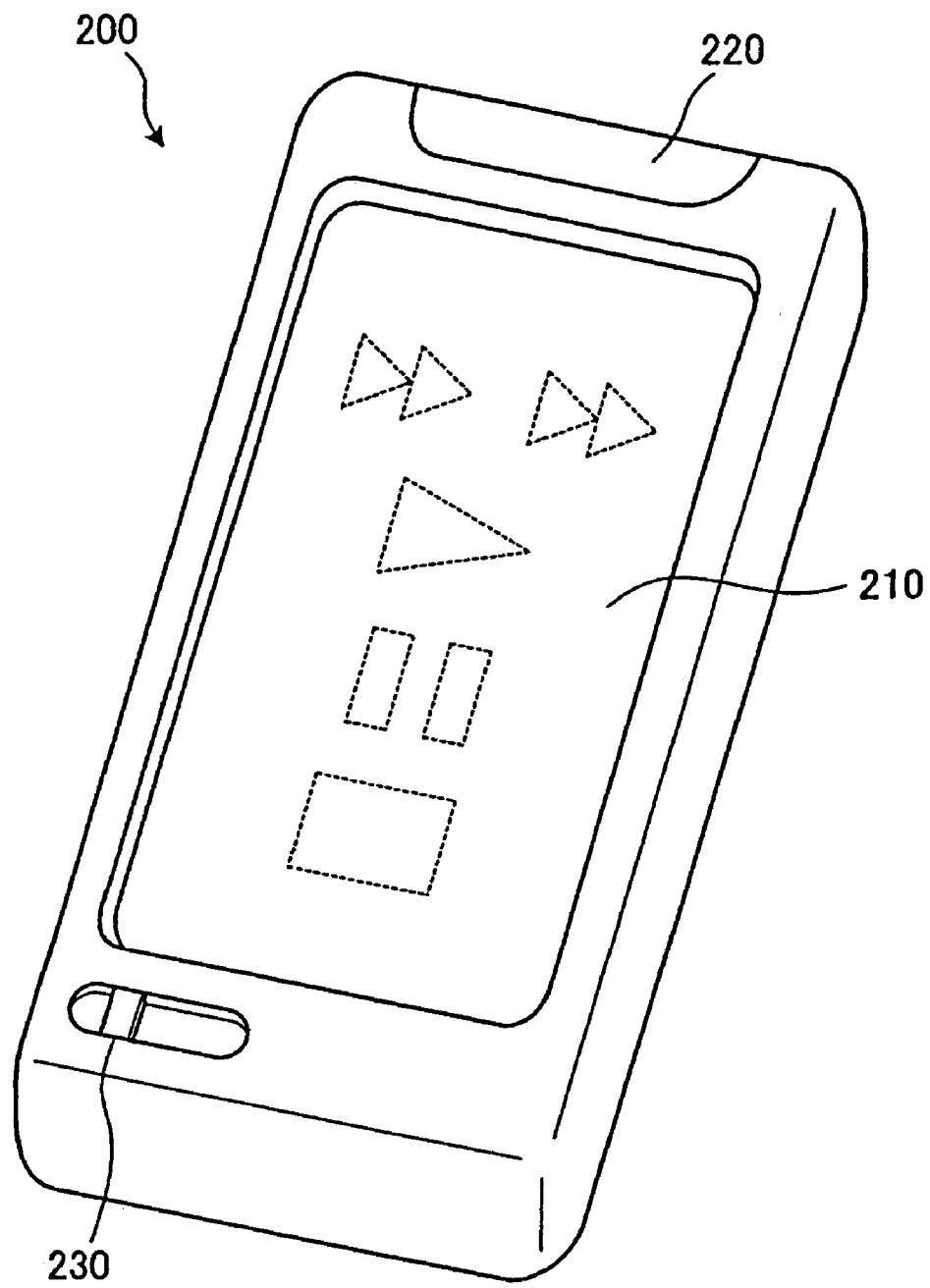
FIG. 9 is a schematic diagram showing an example of an appearance of a remote control apparatus for a video tape recorder, the remote control apparatus according to the input apparatus of the present invention.

FIG. 9 is a schematic diagram showing an appearance of a remote control apparatus according to the present invention, the remote control apparatus being used for a video tape recorder (VTR).

A remote control apparatus 200 shown in FIG. 9 displays operation modes of the VTR. The remote control apparatus 200 has a display and input portion 210 and an infrared transmission portion 220. The display and input portion 210 accepts a selection input for these modes. The infrared transmission portion 220 transmits information such as a command code corresponding to the selection input to the VTR. When the input apparatus according to the present invention is applied to the display and input portion 210 and the user feels an operational sense against an input operation to the display and input portion 210, the operational sense of the remote control apparatus 200 can be improved while it has low power consumption, long life, and low noise. In addition, with a sense pressure set switch 230 that allows the user to set any feedback amount of a force sense of the display and input portion 210, a force sense feedback function corresponding to user's preference may be provided.

In the foregoing embodiment, the input apparatus that has the touch panel portion disposed on the picture display surface and deformed is described. Alternatively, the present invention may be applied to an input apparatus that does not have a picture display portion. In this case, it is preferred that the piezoelectric actuator be evenly disposed on the rear surface of the panel surface of the touch panel portion.

The input apparatus that does not have such a display portion is for example an input pad of a pointing device of an input operation portion of a note type PC, and a tablet device for graphic drawing software.

INDUSTRIAL UTILIZATION

As described above, according to the present invention, an input apparatus that has a force sense feedback function causing the user to feel a natural operational sense can be accomplished while the apparatus has low power consumption in the standby state of a piezoelectric actuator and long life thereof.

DESCRIPTION OF REFERENCE NUMERALS

1 LIQUID CRYSTAL DISPLAY PORTION
1a DISPLAY PANEL
1b FRAME
2 TOUCH PANEL PORTION
2a PRESS PORTION
2b FRAME
3 PIEZOELECTRIC ACTUATOR
4 FLEXIBLE BOARD
5 A/D CONVERTER
6 TOUCH PANEL DETECTION PORTION
7 SENSE PRESSURE SET PORTION
8 ACTUATOR CONTROL PORTION
9 DRIVER CIRCUIT
31a, 31b WIRING TERMINAL
41 MOUNTING PORTION
41a, 41b THROUGH-HOLE
41c CENTER SPACER PORTION
42a, 42b WIRING PATTERN
61 PRESS FORCE DETECTION PORTION
62 COORDINATE DETECTION PORTION
71 SENSE PRESSURE SET SWITCH
81 TIMER
82 REFERENCE VOLTAGE CONTROL PORTION
83 CONTROL SIGNAL OUTPUT PORTION
100 INPUT APPARATUS
S601 DOES TIMER START COUNTING ?
S602 GRADUALLY INCREASE Vref.
S603 TIMER COMPUTERS COUNTING.
S604 HOLD Vref.
S605 TIMING SIGNAL → H
S606 RECEIVE PULL ?
S607 TIMING SIGNAL → L

The invention claimed is:

1. An input apparatus that outputs coordinate values of an operation surface that the user has pressed as an input operation, deforms the operation surface, and causes the user to feel a force sense as a feedback with the deformed operation surface, comprising:
   a deformation mechanism portion that uses a piezoelectric actuator composed of a piezoelectric bi-morph device and that deforms the operation surface;
   a press force detection portion that detects whether the operation surface has been pressed; and
   a control portion that controls said deformation mechanism portion to start driving the piezoelectric actuator to gradually deform the operation surface in one direction and then to deform the operation surface in a reverse direction so that the period for which the operation surface is deformed in one direction is sufficiently larger than the period for which the operation surface is deformed in the reverse direction when said press force detection portion detects that the operation surface has been pressed.

2. The input apparatus as set forth in claim 1,
   wherein when the maximum deformation amount of the operation surface deformed by said deformation mechanism portion is 200 μm or less, the period for which the operation surface is deformed in one direction is 33 times or more than the period for which the operation surface is deformed in the reverse direction.

3. The input apparatus as set forth in claim 1,
   wherein the period for which the operation surface is deformed in the first direction is 200 msec or less.

4. The input apparatus as set forth in claim 1, further comprising:
   a deformation amount set portion that sets the deformation amount of the panel surface corresponding to setting of the user,
   wherein said control portion deforms the operation surface corresponding to setting of the deformation amount of the operation surface.

5. The input apparatus as set forth in claim 4,
   wherein said control portion gradually increases or decreases a drive voltage of the piezoelectric actuator always corresponding to the same waveform and varies the period for which the drive voltage increases or decreases corresponding to the waveform to vary the deformation amount of the operation surface in one direction.

6. The input apparatus as set forth in claim 1,
   wherein said control portion controls said deformation mechanism portion to keep the operation surface deformed in the reverse direction until said press force detection portion detects that the operation surface has been pressed.

7. The input apparatus as set forth in claim 6,
   wherein said control portion controls said deformation mechanism portion to deform the operation surface in the reverse direction for a predetermined period and the operation surface for a period sufficiently longer than the predetermined period so that the voltage applied to the piezoelectric actuator becomes 0 V when said press force detection portion detects that the operation surface has been pressed.

8. The input apparatus as set forth in claim 1,
wherein said deformation mechanism portion has:
- a first spacer disposed on a front surface in the vicinity of a center portion of the piezoelectric actuator; and
- a second spacer and a third spacer disposed on an opposite surface of the front surface of the piezoelectric actuator, the second spacer and the third spacer being disposed in the vicinity of end portions in the longitudinal direction of the piezoelectric actuator,
- wherein the piezoelectric actuator is curved in the direction perpendicular to the surfaces on which the spacers are disposed so as to vary the distance between the front surface of the first spacer and the front surface of the second and third spacers and deform the operation surface.

9. The input apparatus as set forth in claim 1, further comprising:
- a display portion that transmits the operation surface and displays a screen,
- wherein when an operation function item displayed on said display portion is pressed through the operation surface, the operation function item is selected and input.

10. A portable electronic apparatus comprising:
the input apparatus as set forth in claim 1.

11. A remote control apparatus comprising:
the input apparatus as set forth in claim 1.

12. A piezoelectric actuator drive control method for an input apparatus that outputs coordinate values of an operation surface that the user has pressed as an input operation, deforms the operation surface with a piezoelectric actuator composed of a piezoelectric bi-morph device, and causes the user to feel a force sense as a feedback with the deformed operation surface, comprising the step of:
- starting applying a voltage to the piezoelectric actuator and driving the piezoelectric actuator to gradually deform the operation surface in one direction and then in the reverse direction so that the period for which the operation surface is deformed in one direction is sufficiently larger than the period for which the operation surface is deformed in the reverse direction when it is detected that the operation surface has been pressed.

* * * * *